US012566643B2

(12) United States Patent
Mohanty et al.

(10) Patent No.: US 12,566,643 B2
(45) Date of Patent: Mar. 3, 2026

(54) GENERATING TEMPORAL PREDICTIONS FOR PROVISIONING CLOUD RESOURCES USING TRAINED MACHINE LEARNING TECHNIQUES

(71) Applicant: Dell Products L.P., Round Rock, TX (US)

(72) Inventors: Bijan Kumar Mohanty, Austin, TX (US); Divya Maddi, Austin, TX (US); Hung T. Dinh, Austin, TX (US); Vikram Ramdev Bokka, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 607 days.

(21) Appl. No.: 17/506,830

(22) Filed: Oct. 21, 2021

(65) Prior Publication Data

US 2023/0131611 A1 Apr. 27, 2023

(51) Int. Cl.
| | |
|---|---|
| *G06F 9/46* | (2006.01) |
| *G06F 9/50* | (2006.01) |
| *G06N 3/04* | (2023.01) |
| *G06N 3/08* | (2023.01) |

(52) U.S. Cl.
CPC .............. *G06F 9/5083* (2013.01); *G06N 3/04* (2013.01); *G06N 3/08* (2013.01)

(58) Field of Classification Search
CPC ........... G06F 9/5083; G06N 3/04; G06N 3/08
See application file for complete search history.

(56) References Cited

U.S. PATENT DOCUMENTS

| | | | |
|---|---|---|---|
| 2014/0195683 | A1 | 7/2014 | Ammerman, III et al. |
| 2017/0270450 | A1 | 9/2017 | Binotto et al. |
| 2018/0287956 | A1 | 10/2018 | Bryc et al. |
| 2020/0289925 | A1 * | 9/2020 | Norton .................. A63F 13/355 |
| 2020/0412663 | A1 | 12/2020 | Bryc et al. |
| 2021/0136006 | A1 * | 5/2021 | Casey ................. H04L 67/1021 |
| 2021/0287089 | A1 * | 9/2021 | Mayer ..................... G06N 3/04 |
| 2022/0004822 | A1 * | 1/2022 | Vaid .................... G06F 18/2113 |
| 2022/0405611 | A1 * | 12/2022 | Singla ...................... G06N 5/04 |
| 2023/0059038 | A1 * | 2/2023 | Sidhu ................ G06Q 30/0282 |
| 2024/0202586 | A1 * | 6/2024 | Garvin .................. G05B 17/02 |

* cited by examiner

*Primary Examiner* — Tammy E Lee
(74) *Attorney, Agent, or Firm* — Ryan, Mason & Lewis, LLP

(57) ABSTRACT

Methods, apparatus, and processor-readable storage media for generating temporal predictions for provisioning cloud resources using trained machine learning techniques are provided herein. An example computer-implemented method includes training one or more machine learning techniques using historical data pertaining to cloud resource provisioning and related order information; obtaining data pertaining to at least one order related to one or more hardware components, wherein the at least one order includes one or more cloud resources; generating at least one temporal prediction for provisioning the one or more cloud resources, in fulfillment of the at least one order, by processing at least a portion of the obtained data using the one or more trained machine learning techniques; and performing one or more automated actions based at least in part on the at least one generated temporal prediction.

17 Claims, 8 Drawing Sheets

```
# Import necessary libraries
%matplotlib inline
import pandas as pd
import numpy as np
import matplotlib.pyplot as plt
import seaborn as sns
import tensorflow as tf
print (tf._version_)
from sklearn import preprocessing import warnings
from sklearn.mode_selection import train_test_split
warnings.filterwarnings ("ignore")

# reading the historical data file into pandas dataframe
fulfillment_df = pd.read_csv ("order_fulfillment.csv")  # Read the historical order fulfillment data

# OrderNumber doesn't play any role in the target variable.
fulfillment_df = fulfillment_df.drop ("OrderNumber", axis=1)
```

```
# Convert the Categorical values to one-hot encoded
fulfillment_df = pd.get_dummies(fulfillment_df, columns=['Customer'])
fulfillment_df = pd.get_dummies(fulfillment_df, columns=['Location'])
fulfillment_df = pd.get_dummies(fulfillment_df, columns=['Supplier'])
fulfillment_df = pd.get_dummies(fulfillment_df, columns=['LogisticProvider'])
```

```
# Split Train and Test data sets
# First get the independent variables and dependent variable separated
features = [col for col in fulfillment_df.columns if col != 'DeliveryTime']

X_train, X_test, y_train, y_test = train_test_split(fulfillment_df [features], fulfillment_df['DeliveryTime'],
                                                     test_size=.3, random_state=42)

# Normalize and Scale the data
from sklearn.preprocessing import StandardScaler scaler = StandardScaler () .fit(X_train)

Scale the train set
X_trainScaled = scaler.transform(X_train)

# Scale the test set
X_testScaled = scaler.transform(X_test)
```

```
Using Tensorflow Keras to create the Dense Neural Network model for Regression from tensorflow.keras import Sequential
from tensorflow.keras.layers import Dense

# Initialize the constructor
model = Sequential ()

# Add an first hidden layer for the 19 input variables
model.add(Dense(32, input_shape = (19,), activation='relu', kernel_initializer='normal'))

# second hidden layer
model.add(Dense(16, activation='relu', kernel_initializer='normal'))

# Add an output layer with one neuron and no activation
model.add(Dense(1))

# set the loss function and optimizer
model.compile(loss='mean_squared_error', optimizer=optimizer , metrics = ['mae' , 'mse'])
```

```
# Train the model with the training data
history = model.fit(X_trainScaled, y_train.values, validation_split=0.2,
                    epochs=100, batch_size=500, verbose=1)

# Evaluate the loss value of the model using Test data
lose = model.evaluate(X_testScaled, y_test, verbose=False)

# Predict the expected delivery time value from the model
y_predict = model.predict(X_testScaled)
```

FIG. 9

TRAIN ONE OR MORE MACHINE LEARNING TECHNIQUES
USING HISTORICAL DATA PERTAINING TO CLOUD RESOURCE
PROVISIONING AND RELATED ORDER INFORMATION — 900

OBTAIN DATA PERTAINING TO AT LEAST ONE ORDER RELATED
TO ONE OR MORE HARDWARE COMPONENTS, WHEREIN THE AT
LEAST ONE ORDER INCLUDES ONE OR MORE CLOUD RESOURCES — 902

GENERATE AT LEAST ONE TEMPORAL PREDICTION FOR
PROVISIONING THE ONE OR MORE CLOUD RESOURCES, IN
FULFILLMENT OF THE AT LEAST ONE ORDER, BY PROCESSING
AT LEAST A PORTION OF THE OBTAINED DATA USING THE
ONE OR MORE TRAINED MACHINE LEARNING TECHNIQUES — 904

PERFORM ONE OR MORE AUTOMATED ACTIONS BASED AT LEAST IN
PART ON THE AT LEAST ONE GENERATED TEMPORAL PREDICTION — 906

GENERATING TEMPORAL PREDICTIONS FOR PROVISIONING CLOUD RESOURCES USING TRAINED MACHINE LEARNING TECHNIQUES

FIELD

The field relates generally to information processing systems, and more particularly to techniques for resource management using such systems.

BACKGROUND

Cloud hosting has become an integral part of infrastructure architecture, and corresponding resource provisioning in connection with cloud environments has become increasingly complicated and prone to errors. For example, conventional resource provisioning approaches commonly encompass an overall process that includes manufacturing, shipping, installation, deployment and corresponding provisioning. As a more particular example, in the context of server provisioning, such a process can include manufacturing of a physical server, shipping the physical server to a customer location, installing the physical server at the customer location, as well as deployment and then provisioning of corresponding resources. Preemptive temporal estimates of the resource provisioning by conventional approaches are based primarily on incomplete human knowledge and/or static rules, which can lead to inaccurate temporal estimates and customer dissatisfaction.

A large number of factors and/or dimensions can impact the actual provisioning and delivery of cloud resources. Accordingly, the lack of dynamism by conventional approaches can cause the actual delivery of resources to be significantly earlier or later than the committed and/or estimated date, which can, for example, negatively impact the adoption of the corresponding delivery as a service, converged infrastructure offers, customer satisfaction, etc.

SUMMARY

Illustrative embodiments of the disclosure provide techniques for generating temporal predictions for provisioning cloud resources using trained machine learning techniques. An exemplary computer-implemented method includes training one or more machine learning techniques using historical data pertaining to cloud resource provisioning and related order information, and obtaining data pertaining to at least one order related to one or more hardware components, wherein the at least one order includes one or more cloud resources. Additionally, the method includes generating at least one temporal prediction for provisioning the one or more cloud resources, in fulfillment of the at least one order, by processing at least a portion of the obtained data using the one or more trained machine learning techniques. Further, the method includes performing one or more automated actions based at least in part on the at least one generated temporal prediction.

Illustrative embodiments can provide significant advantages relative to conventional resource provisioning approaches. For example, problems associated with inaccurate temporal estimates are overcome in one or more embodiments through generating temporal predictions for provisioning cloud resources using one or more trained machine learning techniques.

These and other illustrative embodiments described herein include, without limitation, methods, apparatus, systems, and computer program products comprising processor-readable storage media.

BRIEF DESCRIPTION OF THE DRAWINGS

FIG. 1 shows an information processing system configured for generating temporal predictions for provisioning cloud resources using trained machine learning techniques in an illustrative embodiment.

FIG. 4 shows an example code snippet for implementing at least a portion of data preprocessing steps in an illustrative embodiment.

FIG. 5 shows an example code snippet for implementing at least a portion of value encoding techniques in an illustrative embodiment.

FIG. 6 shows an example code snippet for implementing at least a portion of data splitting and scaling techniques in an illustrative embodiment.

FIG. 7 shows an example code snippet for implementing at least a portion of neural network model creation techniques in an illustrative embodiment.

FIG. 8 shows an example code snippet for training a neural network model, evaluating the neural network model, and using the neural network model to generate a prediction in an illustrative embodiment.

FIG. 9 is a flow diagram of a process for generating temporal predictions for provisioning cloud resources using trained machine learning techniques in an illustrative embodiment.

DETAILED DESCRIPTION

Figure 2:
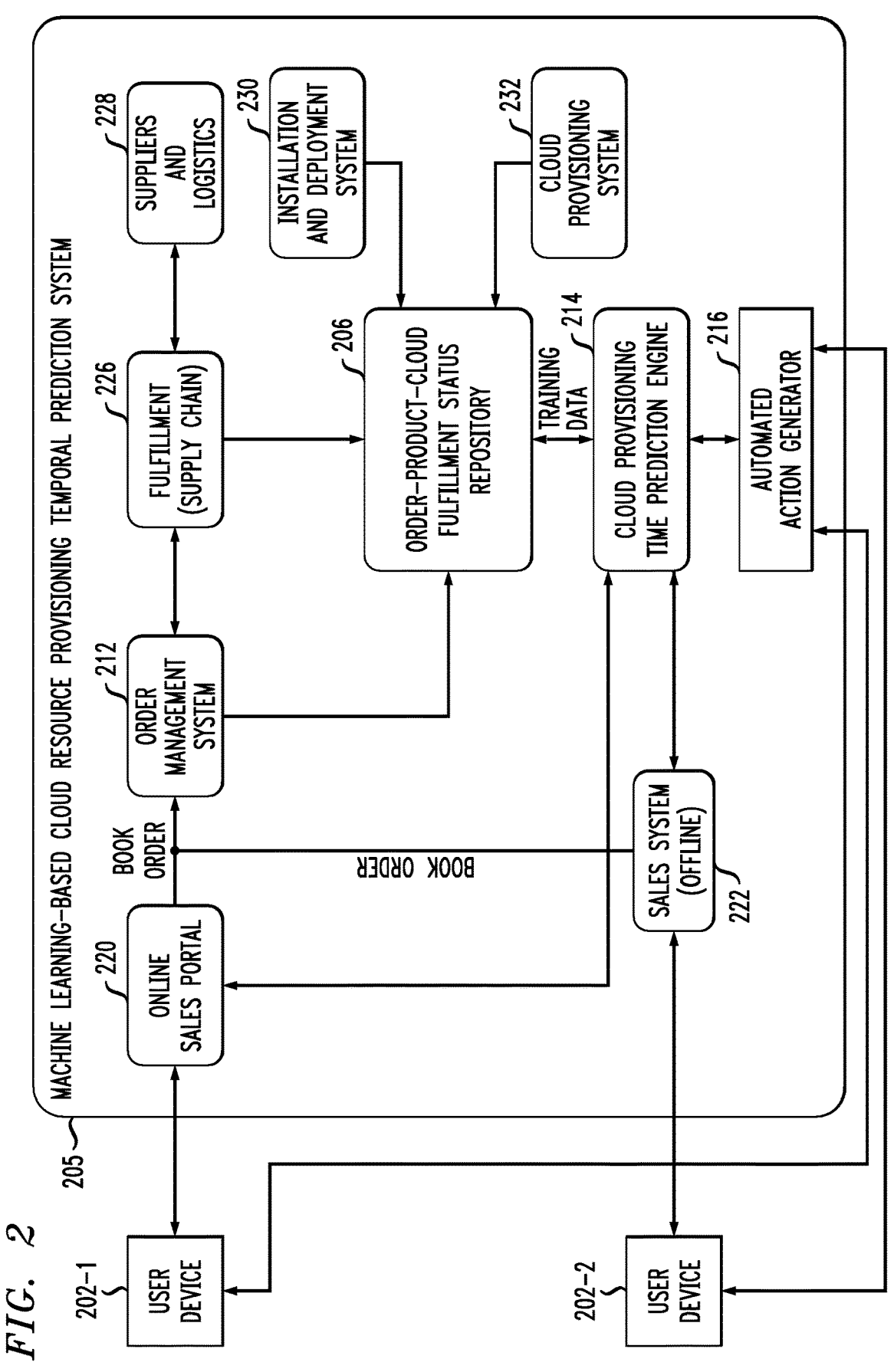
FIG. 2 shows example system architecture in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
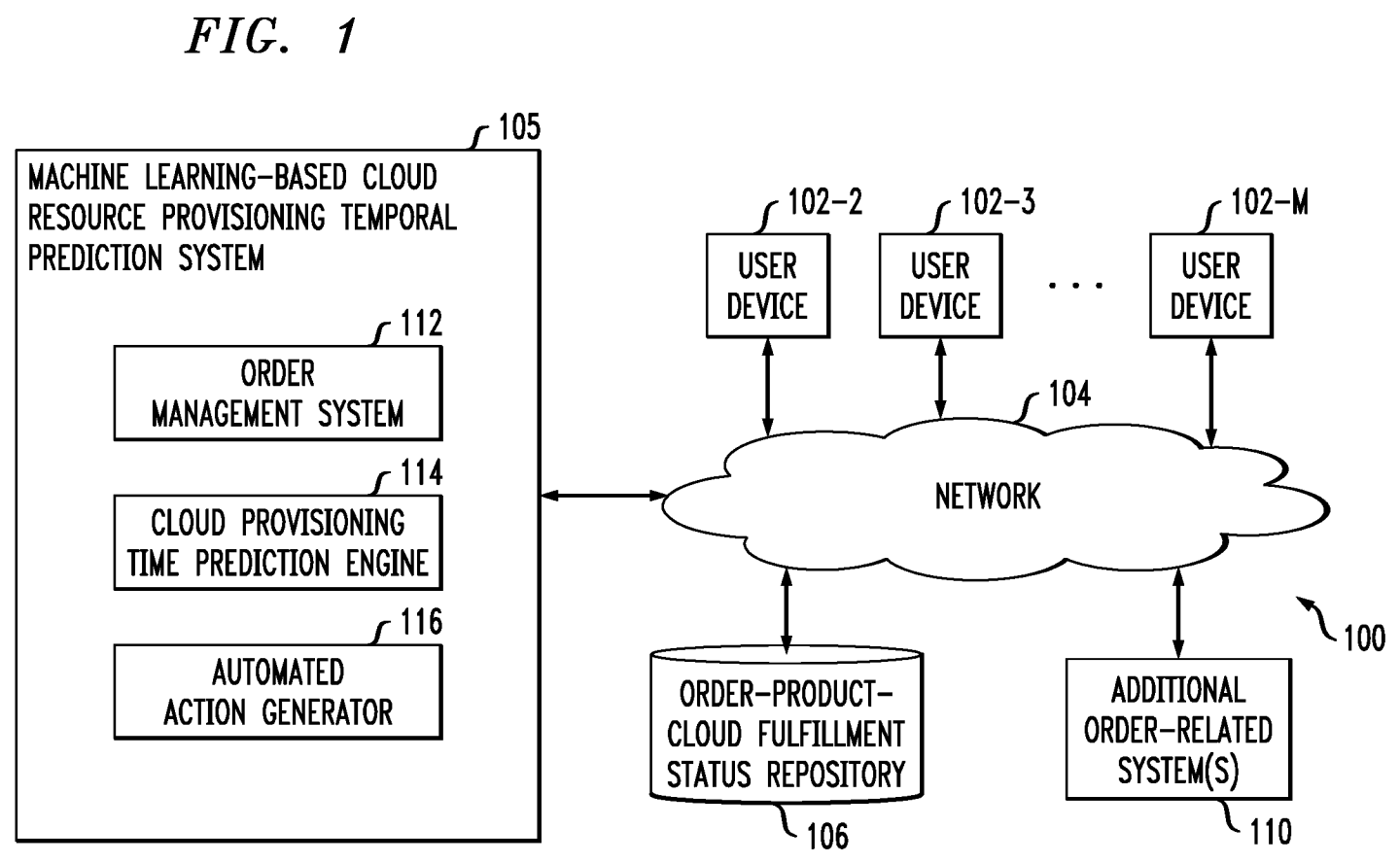

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is machine learning-based cloud resource provisioning temporal prediction system 105 and additional order-related system(s) 110.

The user devices 102 may comprise, for example, mobile telephones, laptop computers, tablet computers, desktop computers or other types of computing devices used, for example, by customers to place orders such as detailed herein in connection with one or more example embodiments. Such devices are examples of what are more generally referred to herein as "processing devices." Some of these processing devices are also generally referred to herein as "computers." The user devices 102 may also comprise, for example, one or more offline devices such as landline telephones, etc.

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, machine learning-based cloud resource provisioning temporal prediction system 105 can have an associated order-product-cloud fulfillment status repository 106 configured to store data pertaining to cloud resource provisioning and related order information, which can include, for example, historical data derived from at least one order management system, at least one supply chain-related system, at least one supplier and logistics system, at least one installation and deployment system, and/or at least one cloud provisioning system.

The order-product-cloud fulfillment status repository 106 in the present embodiment is implemented using one or more storage systems associated with machine learning-based cloud resource provisioning temporal prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with machine learning-based cloud resource provisioning temporal prediction system 105 are one or more input-output devices, which illustratively comprise keyboards, displays or other types of input-output devices in any combination. Such input-output devices can be used, for example, to support one or more user interfaces to machine learning-based cloud resource provisioning temporal prediction system 105, as well as to support communication between machine learning-based cloud resource provisioning temporal prediction system 105 and other related systems and devices not explicitly shown.

Additionally, machine learning-based cloud resource provisioning temporal prediction system 105 in the FIG. 1 embodiment is assumed to be implemented using at least one processing device. Each such processing device generally comprises at least one processor and an associated memory, and implements one or more functional modules for controlling certain features of machine learning-based cloud resource provisioning temporal prediction system 105.

More particularly, machine learning-based cloud resource provisioning temporal prediction system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows machine learning-based cloud resource provisioning temporal prediction system 105 to communicate over the network 104 with the user devices 102, and illustratively comprises one or more conventional transceivers.

The machine learning-based cloud resource provisioning temporal prediction system 105 further comprises order management system 112, cloud provisioning time prediction engine 114, and automated action generator 116.

It is to be appreciated that this particular arrangement of elements 112, 114 and 116 illustrated in the machine learning-based cloud resource provisioning temporal prediction system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for generating temporal predictions for provisioning cloud resources using trained machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of machine learning-based cloud resource provisioning temporal prediction system 105, order-product-cloud fulfillment status repository 106, and additional order-related system(s) 110 can be on and/or part of the same processing platform (such as, for example, depicted in FIG. 2).

An exemplary process utilizing elements 112, 114 and 116 of an example machine learning-based cloud resource provisioning temporal prediction system 105 in computer network 100 will be described in more detail with reference to the flow diagram of FIG. 9.

Accordingly, at least one embodiment includes automatically generating provisioning time predictions in connection with converged, hybrid cloud environments. Such an embodiment includes predicting, using machine learning techniques, expected delivery times for cloud services based at least in part on manufacturing data, shipping data, and provisioning data pertaining to specific cloud services. By way of example, at least one regression-based machine learning algorithm can extract such features from historical data and accurately estimate the provisioning timeline of specific cloud services sold to at least one customer.

Hyper-converged infrastructure provisioning typically involves complex processes for manufacturing, shipping, installation and deployment of infrastructure at customer datacenters. Also, many enterprises adopt varieties of clouds including public, private and hybrid clouds and corresponding resources that must be provisioned. This can vary, for example, from provisioning of virtual machines to custom application installations, database provisioning, anti-virus scanning, high availability (HA) configuration, load balancing, storage as a service, monitoring as a service backup as a service, etc.

As the complexities of provisioning cloud services increase, the actual delivery time calculation complexities can potentially also increase. Conventionally, the committed cloud delivery time is estimated as the sum of manufacturing, transportation, and provisioning lead times. The manufacturing lead time can include the in-house manufacturing process lead time and the procurement lead-time to buy the dependent components from suppliers. Typically, these types of time estimates are based on the commitments from the manufacturing teams and the suppliers based on their capacities and constraints, as well as the relevant agreements and associated service-level agreements (SLAs). Such dates are often agreed upon and stored in enterprise resource planning systems statically. Actual manufacturing time of a product, however, can depend upon a variety of factors including location, seasonality, efficiency of the factory, typical inventory status of the material and the suppliers of those materials, etc. Similarly, transportation time can depend upon the customer location, manufacturing location, logistics provider, etc. In addition to these, cloud provisioning time also depends upon the type of provisioning, items to be provisioned, engineers, customer location, etc. Further, the manufacturing lead time can depend on the product complexity, dependent product procurement, availability of the labor, local holidays, transportation, etc. Accordingly, many factors can influence delivery lead time.

In at least one embodiment, one or more databases (e.g., enterprise resource planning systems) and/or supply chain and logistics systems capture and store the timestamp of each stage of the manufacturing, procurement and/or transportation processes for every product, from the date of order to the final delivery of product at the customer data center. Similarly, data pertaining to installation and/or deployment and provisioning of cloud resources are captured with the timestamps at various stages in services delivery and provisioning systems.

Accordingly, at least one embodiment includes utilizing historical hyper-converged and private cloud order data, along with corresponding fulfillment information (including, e.g., the products, their materials, suppliers, actual time of each step of manufacturing, and final delivery time) to train a multi-layer perceptron (MLP), a deep neural network, to accurately predict the delivery lead time of a new sales order. In such an embodiment, the neural network is applied as a regression model to predict the estimated delivery time, improving customer confidence and experience, while also reducing resource wastage.

Additionally, one or more embodiments include conducting at least one data engineering step in connection with acquiring data from enterprise resource planning systems, order management systems, supply chain systems, services delivery and provisioning systems, etc., and extracting one or more features and/or independent variables from the engineered data such as, for example, customer identity, customer location, components, supplier identity, manufacturing location, logistics provider, installation party, provisioning time of individual cloud services, etc. The extracted features and/or variables are filtered to create a dataset that can be stored in a historical data repository for future training and analysis (e.g., training at least one regression-based deep learning model for prediction, as further detailed herein).

FIG. 2 shows example system architecture in an illustrative embodiment. By way of illustration, FIG. 2 depicts machine learning-based cloud resource provisioning temporal prediction system 205, user device 202-1, which can include an online-capable device, as well as user device 202-2, which can include an offline device. Additionally, in FIG. 2, machine learning-based cloud resource provisioning temporal prediction system 205 includes an online sales portal 220, which processes inputs from user device 202-1 and books at least one order with order management system 212. Also, offline sales system 222 processes inputs from user device 202-2 and books at least one order with order management system 212. Further, order management system 212 interacts with and/or receives inputs from fulfillment (e.g., supply chain) component 226 and suppliers and logistics component 228, both of which can represent examples of the additional order-related system(s) 110 depicted in FIG. 1. Also, order management system 212 provides order-related data (derived from the booked orders and/or the inputs from components 226 and 228) to order-product-cloud fulfillment status repository 206.

As also depicted in FIG. 2, installation and deployment system 230, as well as cloud provisioning system 232 (both of which can represent examples of the additional order-related system(s) 110 depicted in FIG. 1) additionally provide inputs to order-product-cloud fulfillment status repository 206. Accordingly, using at least portions of the inputs provided, as detailed above, order-product-cloud fulfillment status repository 206 provides training data to cloud provisioning time prediction engine 214 to train the model associated therewith. Subsequently, the trained model of cloud provisioning time prediction engine 214 generates one or more cloud provisioning time predictions and outputs the generated prediction(s) to automated action generator 216 as well as to online sales portal 220 and/or offline sales system 222. The one or more cloud provisioning time predictions generated by cloud provisioning time prediction engine 214 correspond to one or more new orders booked by online sales portal 220 and/or offline sales system 222, wherein data related to such booked order(s) are provided to the cloud provisioning time prediction engine where at least a portion of such data is processed by the trained model. Also, as illustrated in FIG. 2, automated action generator 216 can, based at least in part on the generated prediction(s) from cloud provisioning time prediction engine 214, interact with user device 202-1 and/or user device 202-2.

In one or more example embodiments, such as depicted in FIG. 2, order-product-cloud fulfillment status repository 206 stores various items of historical fulfillment-related data, which can be used as an indicator for estimating the future provisioning of cloud services in connection with an order. Accordingly, such an embodiment includes building the order-product-cloud fulfillment status repository 206 to contain historical fulfillment data from order management system 212, fulfillment (e.g., supply chain) component 226, suppliers and logistics component 228, and provisioning systems (e.g., installation and deployment system 230, as well as cloud provisioning system 232) pertaining to order-related data including information related to corresponding products, parts, suppliers, logistics, deployments and provisioning.

In at least one embodiment, data engineering and data analysis can be carried out on at least a portion of such data to understand one or more features and data elements that influence the delivery and/or deployment of infrastructure at customer locations and eventual provisioning time of cloud services such that only those data elements are filtered for storage in order-product-cloud fulfillment status repository 206. This order-product-cloud fulfillment status repository 206 will contain fulfillment order status change dates and times as orders progress through the supply chain, services delivery, and provisioning systems. As product parts are manufactured and/or procured from various suppliers, the actual delivery times of such parts as well as the assembly times are captured. Similarly, the installation and deployment dates and times of the system at the customer data center can be captured as well as the time taken to provision individual cloud services in the order.

All such dates and times will play a role in training the neural network model in cloud provisioning time prediction engine 214, as further detailed below. Sample data elements that will be stored in this repository and used for training the model can include, for example, customer information, cloud offer information, product information, quantity information, parts information, supplier information, manufacturing location(s), customer data center location(s), logistics provider information, deployment information, provision time(s), etc.

In at least one embodiment, such as depicted in FIG. 2, for example, cloud provisioning time prediction engine 214 is responsible for predicting the expected provisioning time for an order by calculating the timeline of individual offers and the lead-time of the offer as well as the product (procurement, manufacturing, and delivery and/or transportation) required to deploy the resources at the customer location(s). In such an embodiment, cloud provisioning time prediction engine 214 can be used to predict a committed delivery date to the customer while booking the order, and also provide the foundation for analyzing the performance of suppliers and logistic providers.

Cloud provisioning time prediction engine 214 leverages one or more supervised learning mechanisms and trains at least one model with historical data (derived, e.g., from order-product-cloud fulfillment status repository 206) pertaining to the actual delivery time of each product and order containing those products. As noted above, features can be extracted from such historical data, and during the training of the at least one model, at least a portion of such features are fed into the at least one model as the independent variable, and the actual delivery time is the dependent and/or target value. On receiving an order with one or more of the products, the trained model is used to predict the estimated delivery time.

Figure 3:
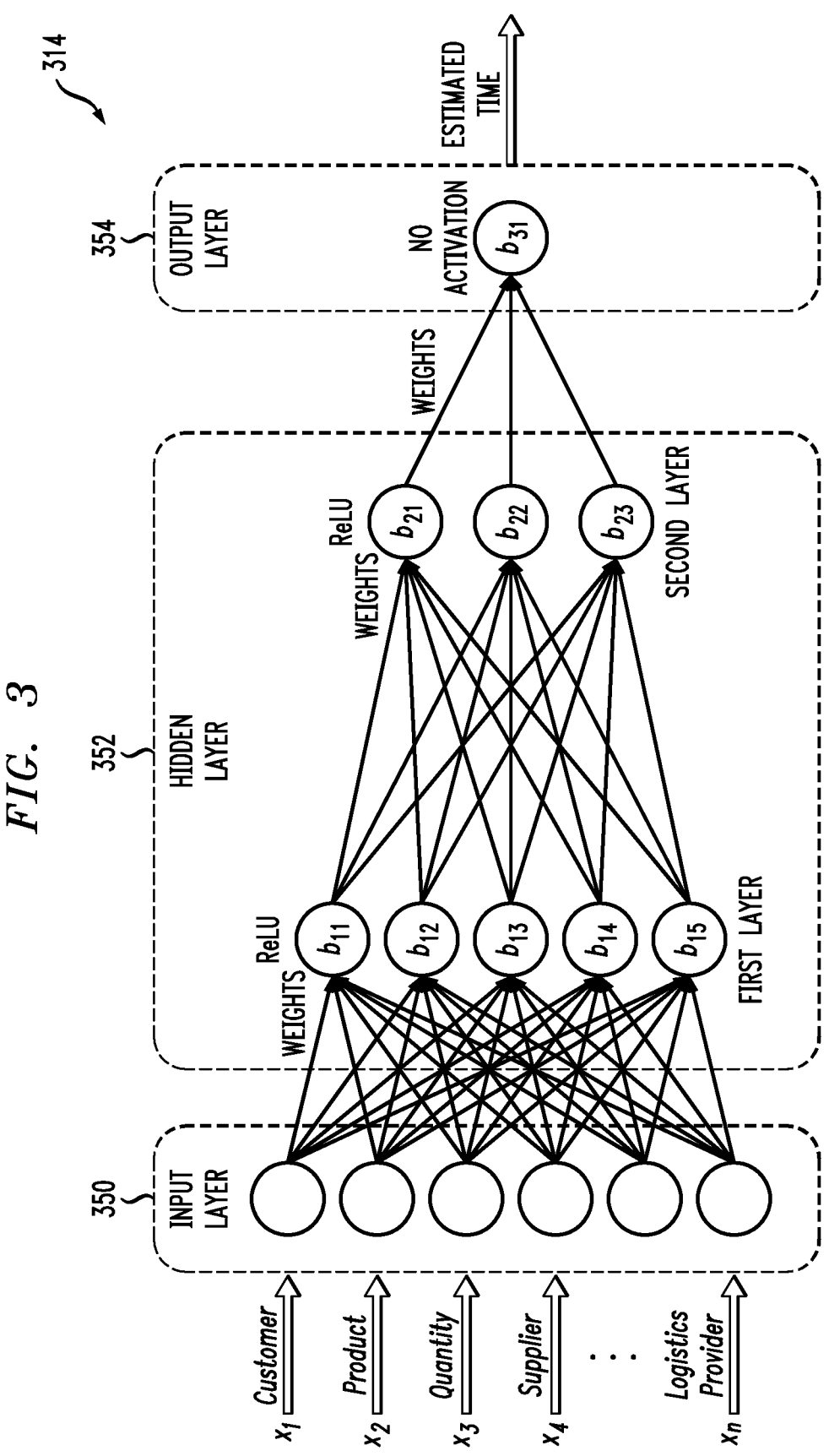
FIG. 3 shows example architecture of a neural network utilized in an illustrative embodiment.

As further detailed, for example, in connection with FIG. 3, cloud provisioning time prediction engine 214 utilizes and/or incorporates at least one deep neural network by building a dense, multi-layer neural network which can act as a sophisticated regressor.

FIG. 3 shows example architecture of a neural network utilized in an illustrative embodiment. By way of illustration, FIG. 3 depicts neural network 314, which includes an input layer 350, one or more hidden layers 352 (e.g., a first hidden layer and a second hidden layer in the FIG. 3 example), and an output layer 354. Input layer 350 can include a number of neurons that matches the number of input and/or independent variables. For instance, in the example embodiment depicted in FIG. 3, input layer 350 includes neurons corresponding at least to customer input $(x_1)$, product input $(x_2)$, quantity input $(x_3)$, supplier input $(x_4)$, and logistics provider input $(x_n)$.

Hidden layer(s) 352, in the FIG. 3 example embodiment, includes two layers and the neuron on each layer depends upon the number of neurons in the input layer. The output layer 354 contains one neuron, as this example neural network 314 is a regression model (e.g., a dense artificial neural network-based regressor model used to predict estimated time values), meaning that the output is a continuous numerical value representing the expected time taken to deliver the given product(s) and/or order.

Accordingly, while there are five neurons/nodes shown in the first hidden layer and three neurons/nodes shown in the second hidden layer in the FIG. 3 example, the actual values can depend upon the total number of neurons in the input layer. At least one embodiment includes implementing one or more methods of calculation based on the number of nodes in the input layer. For example, the numbers in the first hidden layer can be calculated based on an algorithm of matching the power of two to the number of input nodes. For instance, if the number of input variables is 19, it falls in the range of $2^5$. That means that the first layer will have $2^5=32$ neurons/nodes. In such an embodiment, the second layer will contain $2^4=16$ neurons/nodes. If an example embodiment further included a third hidden layer, that third hidden layer would include $2^3=8$ neurons/nodes.

Typically, the neurons in the hidden layers and output layer contain an activation function which drives if the neuron will fire or not. In one or more embodiments, such as depicted in hidden layer 352 of FIG. 3, at least one rectified linear unit (ReLU) activation function is used in both hidden layers. Considering the model is being architected to behave as a regressor, the output neuron in such an example embodiment will not contain an activation function.

Considering that the example neural network 314 depicted in FIG. 3 is a dense neural network, each node will connect with each other. Each connection will have a weight factor (w) and the nodes will have a bias factor (such as, for example, $b_{11}$, $b_{12}$, $b_{13}$, $b_{14}$ and bis for the nodes in the first layer of hidden layer 352, $b_{21}$, $b_{22}$ and $b_{23}$ for the nodes in the second layer of hidden layer 352, and $b_{31}$ for the node in output layer 354). These weight and bias values can be set, for example, randomly by the neural network, and can be started as 1 or 0 for all values. In such an embodiment, each neuron/node performs a linear calculation by combining the multiplication of each input variable ($x_1$, $x_2$ . . . ) with their weight factors, and then adding the bias of the neuron. The formula for this calculation can accordingly include the following: $ws_1 = x_1.w_1 + x_2.w_2 + . . . + b_1$, wherein $ws_1$ is the weighted sum of neuron1; $x_1$, $x_2$, etc. are the input values to the model; $w_1$, $w_2$, etc. are the weight values applied to the connections to neuron1; and $b_1$ is the bias value of neuron1. In one or more embodiments, this weighted sum is input to an activation function (e.g., ReLU) which computes the value of the activation function. Similarly, in such an embodiment, the weighted sum and activation function values of all other neurons in the layer are calculated, and these values are fed to the neurons of the next layer. The same process can be repeated in the next layer(s) of neurons until the values are fed to the neuron of the output layer, wherein the weighted sum is calculated and compared to the actual target value. Depending upon the difference, the loss value can be calculated.

Such a pass through of the neural network is a forward propagation which calculates the error and drives a backpropagation through the neural network to minimize the loss or error at each neuron of the network. Considering the error or loss generated by all of the neurons in the neural network, backpropagation goes through each layer, from back to front, and attempts to minimize the loss by using at least one gradient descent-based optimization mechanism. Considering that the example neural network 314 depicted in FIG. 3 is implemented as a regressor, at least one embodiment includes using mean squared error (MSE) as the loss function, and using adaptive moment estimation (Adam) as the optimization algorithm.

A result of this backpropagation can be to adjust the weight and/or bias values at each connection and neuron level to reduce the error or loss. Additionally, in one or more embodiments, once all of the observations of the training data are passed through the neural network, an epoch is completed. Another forward propagation can then be initiated with the adjusted weight and/or bias values, which are considered as a second epoch, and the same process of forward and backpropagation is repeated in the subsequent epochs. This process of repeating epochs can result in the continued reduction of loss to a point (e.g., close to 0) at which point the neural network is considered to be sufficiently trained for prediction.

An example implementation of a cloud provisioning time prediction engine, as detailed herein, can be achieved as denoted in the code snippets depicted in FIG. 4 through FIG. 8, using, for instance, Keras with Tensorflow backend, Python language, as well as Pandas, Numpy and ScikitLearn libraries.

FIG. 4 shows an example code snippet for implementing at least a portion of data preprocessing steps in an illustrative embodiment. In this embodiment, example code snippet 400 is executed by or under the control of at least one processing system and/or device. For example, the example code snippet 400 may be viewed as comprising a portion of a software implementation of at least part of machine learning-based cloud resource provisioning temporal prediction system 105 of the FIG. 1 embodiment.

As illustrated in example code snippet 400, a dataset from the historical fulfillment status repository is read and a Pandas data frame is generated which contains columns including independent variables and the dependent and/or target variable column. An initial step can include preprocessing data to handle any null or missing values in the columns. Null or missing values in numerical columns can be replaced, for example, by the median value of that column. After performing initial data analysis by creating one or more univariate and bivariate plots of these columns, the importance and influence of each column can be determined. By way of example, columns such as order number, which have no role or influence on the actual delivery time (target variable), can be dropped.

It is to be appreciated that this particular example code snippet shows just one example implementation of data preprocessing, and alternative implementations of the process can be used in other embodiments.

FIG. 5 shows an example code snippet for implementing at least a portion of value encoding techniques in an illustrative embodiment. In this embodiment, example code snippet 500 is executed by or under the control of at least one processing system and/or device. For example, the example code snippet 500 may be viewed as comprising a portion of a software implementation of at least part of machine learning-based cloud resource provisioning temporal prediction system 105 of the FIG. 1 embodiment.

The example code snippet 500 illustrates using one-hot encoding or dummy variable encoding (get_dummies function of pandas) to encode textual categorical values in the columns such that one or more machine learning models (e.g., neural network 314) can deal with related numerical values.

It is to be appreciated that this particular example code snippet shows just one example implementation of value encoding techniques, and alternative implementations of the process can be used in other embodiments.

FIG. 6 shows an example code snippet for implementing at least a portion of data splitting and scaling techniques in an illustrative embodiment. In this embodiment, example code snippet 600 is executed by or under the control of at least one processing system and/or device. For example, the example code snippet 600 may be viewed as comprising a portion of a software implementation of at least part of machine learning-based cloud resource provisioning temporal prediction system 105 of the FIG. 1 embodiment.

The example code snippet 600 illustrates splitting the dataset into training and testing datasets using a train test split function of the ScikitLearn library (e.g., using a 70%-30% split). Considering that the example detailed in connection with code snippet 600 includes a regression use case and a dense neural network will be used as the model, the data is also scaled before being passed to the model, and the scaling is performed after the training and testing split is performed. This can be achieved, for example, by passing the training data and test data to a StandardScaler of the ScikitLearn library. At the end of these activities, the data is ready for model training and/or testing.

It is to be appreciated that this particular example code snippet shows just one example implementation of data splitting and scaling techniques, and alternative implementations of the process can be used in other embodiments.

FIG. 7 shows an example code snippet for implementing at least a portion of neural network model creation techniques in an illustrative embodiment. In this embodiment, example code snippet 700 is executed by or under the control of at least one processing system and/or device. For example, the example code snippet 700 may be viewed as comprising a portion of a software implementation of at least part of machine learning-based cloud resource provisioning temporal prediction system 105 of the FIG. 1 embodiment.

The example code snippet 700 illustrates creating a multi-layer dense neural network using Keras library. Using the function Sequential( ), the shell model is created, and then individual layers are added by calling the add( ) function of the model and passing an instance of Dense( ) to indicate that the network is a dense neural network. Accordingly, all of the neurons in each layer will connect with all of the neurons from preceding and following layers. Additionally, the Dense( ) function will accept parameters for number of neurons on a given layer, type of activation function used, and if there are any kernel parameters. Multiple hidden layers and an output layer are added by calling the add( ) function to the model. Once the model is created, loss function, optimizer type and validation metrics are added to the model using a compile( ) function. Also, in the example embodiment depicted in FIG. 7, Adam is used as the optimizer, and MSE and mean absolute error (MAE) are used as metrics.

It is to be appreciated that this particular example code snippet shows just one example implementation of neural network model creation techniques, and alternative implementations of the process can be used in other embodiments.

FIG. 8 shows an example code snippet for training a neural network model, evaluating the neural network model, and using the neural network model to generate a prediction in an illustrative embodiment. In this embodiment, example code snippet 800 is executed by or under the control of at least one processing system and/or device. For example, the example code snippet 800 may be viewed as comprising a portion of a software implementation of at least part of machine learning-based cloud resource provisioning temporal prediction system 105 of the FIG. 1 embodiment.

The example code snippet 800 illustrates training the neural network model by calling a fit( ) function of the model and passing training data and a number of epochs. After the model completes the specified number of epochs, it is trained and ready for validation. The loss or error value can be obtained by calling an evaluate( ) function of the model and passing test data. This loss value indicates how well the model is trained; a high loss value means that the model is not sufficiently trained, and hyperparameter tuning may be required. Typically, the number of epochs can be increased to train the model more, and other hyperparameter tuning can be done by changing the loss function, changing the optimizer algorithm, and/or making changes to the neural network architecture by adding one or more hidden layers. Once the model is fully trained with a reasonable value of loss (e.g., close to 0), the model is ready for prediction. Prediction of the model is achieved by calling a predict( ) function of the model and passing the independent variables of test data (for comparing training data and test data) or the real values that need to be predicted to estimate the expected provisioning time (i.e., the target variable).

It is to be appreciated that this particular example code snippet shows just one example implementation of training a neural network model, evaluating the neural network model, and using the neural network model to generate a prediction, and alternative implementations of the process can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

FIG. 9 is a flow diagram of a process for generating temporal predictions for provisioning cloud resources using trained machine learning techniques in an illustrative embodiment. It is to be understood that this particular process is only an example, and additional or alternative processes can be carried out in other embodiments.

In this embodiment, the process includes steps 900 through 906. These steps are assumed to be performed by the machine learning-based cloud resource provisioning temporal prediction system 105 utilizing its elements 112, 114 and 116.

Step 900 includes training one or more machine learning techniques using historical data pertaining to cloud resource provisioning and related order information. In at least one embodiment, training the one or more machine learning techniques includes training at least one neural network using historical data pertaining to cloud resource provisioning and related order information. In such an embodiment, training the at least one neural network includes training at least one dense artificial neural network-based regressor model comprising an input layer, one or more hidden layers, and an output layer. Further, in such an embodiment, the input layer can include a number of neurons that matches a number of independent variables associated with the at least one neural network, each of the one or more hidden layers includes a number of neurons that is based at least in part on the number of neurons in the input layer, and each of the one or more hidden layers includes at least one ReLU activation function. Further, in one or more embodiments, each neuron across the input layer, the one or more hidden layers, and the output layer connects with each other neuron, wherein each connection includes a weight factor, and wherein each neuron includes a bias factor.

Also, as detailed herein, in at least one embodiment, training the one or more machine learning techniques can include training the one or more machine learning techniques using historical data derived from at least one order management system, at least one supply chain-related system, at least one supplier and logistics system, at least one installation and deployment system, and/or at least one cloud provisioning system.

Step 902 includes obtaining data pertaining to at least one order related to one or more hardware components, wherein the at least one order comprises one or more cloud resources. Step 904 includes generating at least one temporal prediction for provisioning the one or more cloud resources, in fulfillment of the at least one order, by processing at least a portion of the obtained data using the one or more trained machine learning techniques.

Step 906 includes performing one or more automated actions based at least in part on the at least one generated temporal prediction. In at least one embodiment, performing the one or more automated actions includes outputting the at least one temporal prediction to one or more users associated with the at least one order. Additionally or alternatively, performing the one or more automated actions can include further training the one or more machine learning techniques based at least in part on temporal data derived from fulfill-ment of the at least one order and the at least one temporal prediction.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodi-ments, or certain steps may be performed concurrently with one another rather than serially.

The above-described illustrative embodiments provide significant advantages relative to conventional approaches. For example, some embodiments are configured to generate temporal predictions for provisioning cloud resources using one or more trained machine learning techniques. These and other embodiments can effectively overcome problems asso-ciated with inaccurate temporal estimates.

It is to be appreciated that the particular advantages described above and elsewhere herein are associated with particular illustrative embodiments and need not be present in other embodiments. Also, the particular types of infor-mation processing system features and functionality as illus-trated in the drawings and described above are exemplary only, and numerous other arrangements may be used in other embodiments.

As mentioned previously, at least portions of the infor-mation processing system 100 can be implemented using one or more processing platforms. A given such processing platform comprises at least one processing device compris-ing a processor coupled to a memory. The processor and memory in some embodiments comprise respective proces-sor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines pro-vided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as dis-closed herein can include cloud-based systems. Virtual machines provided in such systems can be used to imple-ment at least portions of a computer system in illustrative embodiments.

In some embodiments, the cloud infrastructure addition-ally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtual-ization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
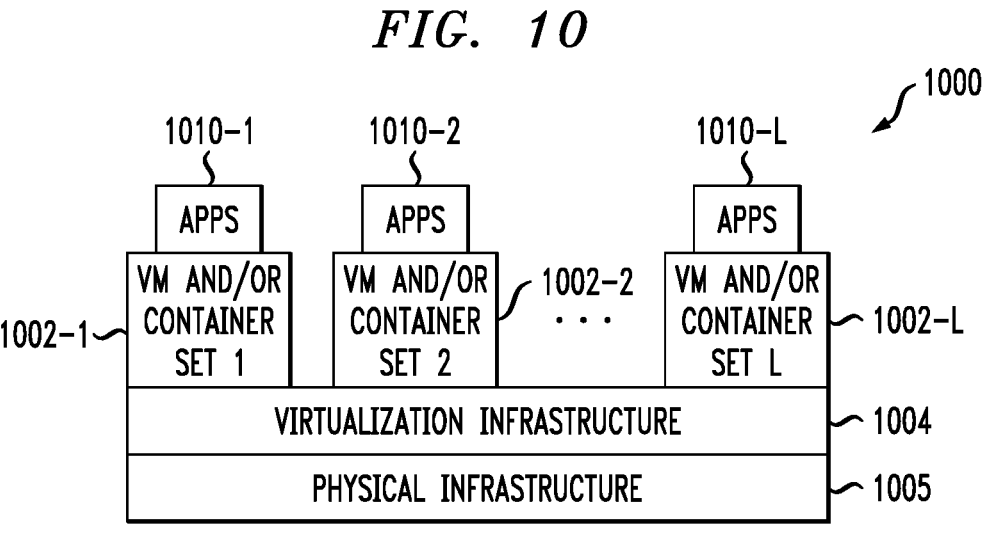
FIGS. 10 and 11 show examples of processing platforms that may be utilized to implement at least a portion of an information processing system in illustrative embodiments.
Figure 11:
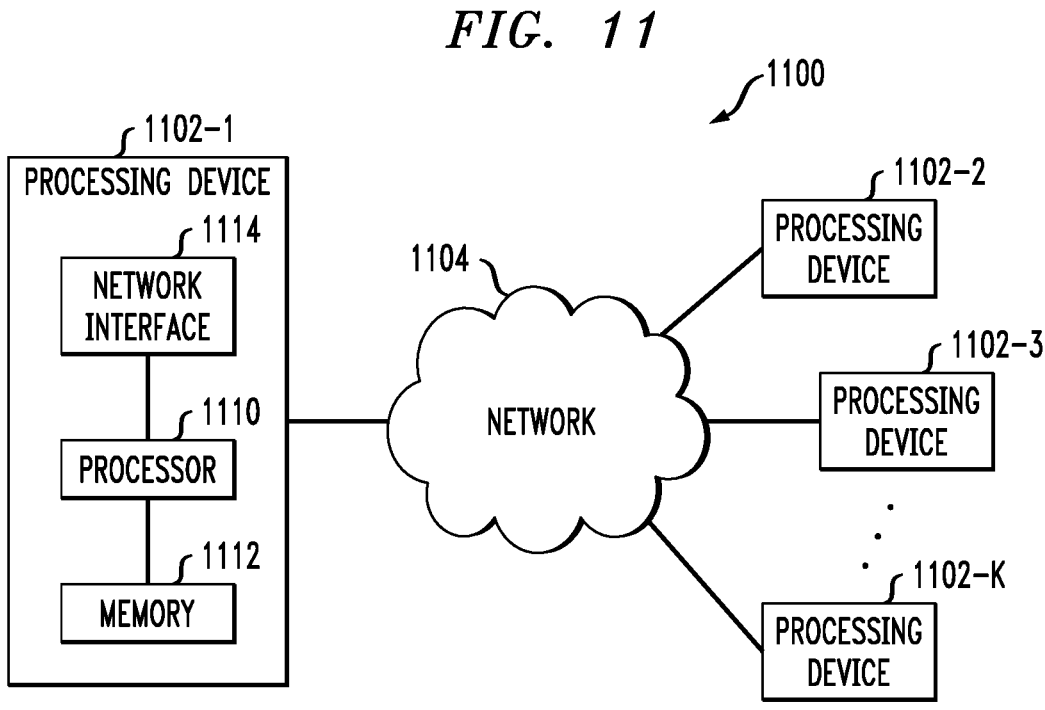

FIG. 10 shows an example processing platform compris-ing cloud infrastructure 1000. The cloud infrastructure 1000 comprises a combination of physical and virtual processing resources that are utilized to implement at least a portion of the information processing system 100. The cloud infra-structure 1000 comprises multiple virtual machines (VMs) and/or container sets 1002-1, 1002-2, . . . 1002-L imple-mented using virtualization infrastructure 1004. The virtu-alization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respec-tive ones of the VMs/container sets 1002-1, 1002-2, . . . 1002-L under the control of the virtualization infrastructure 1004. The VMs/container sets 1002 comprise respective VMs, respective sets of one or more containers, or respec-tive sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more distributed processing plat-forms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel con-trol groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a microcontroller, an application-specific integrated circuit (ASIC), a field-programmable gate array (FPGA) or other type of processing circuitry, as well as portions or combinations of such circuitry elements.

The memory 1112 comprises random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
training at least one dense artificial neural network-based regressor model, comprising at least one input layer, one or more hidden layers, and at least one output layer, using historical data pertaining to cloud resource provisioning and related order information, wherein each of the one or more hidden layers comprises a number of neurons that is based at least in part on a number of neurons in the input layer, and wherein training the at least one dense artificial neural network-based regressor model comprises:
determining influence of one or more features in the historical data on provisioning time of one or more cloud resources by processing at least a portion of the historical data using one or more univariate analysis techniques and one or more bivariate analysis techniques;
generating at least one training dataset by filtering at least a portion the one or more features in the historical data based at least in part on the determined influence of the one or more features; and
training at least a portion of the at least one dense artificial neural network-based regressor model using the at least one generated training dataset;
obtaining data pertaining to at least one order related to one or more hardware components, wherein the at least one order comprises one or more cloud resources;
generating at least one temporal prediction for provisioning the one or more cloud resources, in fulfillment of the at least one order, by processing at least a portion of the obtained data using the trained at least one dense artificial neural network-based regressor model; and performing one or more automated actions based at least in part on the at least one generated temporal prediction, wherein performing the one or more automated actions comprises:

outputting the at least one temporal prediction to one or more user devices associated with submitting the at least one order and one or more external systems associated with processing the at least one order; and further training the at least one dense artificial neural network-based regressor model based at least in part on (i) actual provisioning time data associated with fulfillment of the at least one order and (ii) the at least one temporal prediction;

wherein the method is performed by at least one processing device comprising a processor coupled to a memory.

2. The computer-implemented method of claim 1, wherein training the at least one dense artificial neural network-based regressor model comprises training at least one dense artificial neural network-based regressor model using historical data pertaining to cloud resource provisioning and related order information.

3. The computer-implemented method of claim 1, wherein the input layer comprises a number of neurons that matches a number of independent variables associated with the at least one neural network.

4. The computer-implemented method of claim 1, wherein each of the one or more hidden layers comprises at least one rectified linear unit activation function.

5. The computer-implemented method of claim 1, wherein each neuron across the input layer, the one or more hidden layers, and the output layer connects with each other neuron, wherein each connection comprises a weight factor, and wherein each neuron comprises a bias factor.

6. The computer-implemented method of claim 1, wherein training the at least one dense artificial neural network-based regressor model comprises training the at least one dense artificial neural network-based regressor model using historical data derived from one or more of at least one order management system, at least one supply chain-related system, at least one supplier and logistics system, at least one installation and deployment system, and at least one cloud provisioning system.

7. A non-transitory processor-readable storage medium having stored therein program code of one or more software programs, wherein the program code when executed by at least one processing device causes the at least one processing device:

to train at least one dense artificial neural network-based regressor model, comprising at least one input layer, one or more hidden layers, and at least one output layer, using historical data pertaining to cloud resource provisioning and related order information, wherein each of the one or more hidden layers comprises a number of neurons that is based at least in part on a number of neurons in the input layer, and wherein training the at least one dense artificial neural network-based regressor model comprises:

determining influence of one or more features in the historical data on provisioning time of one or more cloud resources by processing at least a portion of the historical data using one or more univariate analysis techniques and one or more bivariate analysis techniques;

generating at least one training dataset by filtering at least a portion the one or more features in the historical data based at least in part on the determined influence of the one or more features; and training at least a portion of the at least one dense artificial neural network-based regressor model using the at least one generated training dataset;

to obtain data pertaining to at least one order related to one or more hardware components, wherein the at least one order comprises one or more cloud resources;

to generate at least one temporal prediction for provisioning the one or more cloud resources, in fulfillment of the at least one order, by processing at least a portion of the obtained data using the trained at least one dense artificial neural network-based regressor model; and to perform one or more automated actions based at least in part on the at least one generated temporal prediction, wherein performing the one or more automated actions comprises:

outputting the at least one temporal prediction to one or more user devices associated with submitting the at least one order and one or more external systems associated with processing the at least one order; and further training the at least one dense artificial neural network-based regressor model based at least in part on (i) actual provisioning time data associated with fulfillment of the at least one order and (ii) the at least one temporal prediction.

8. The non-transitory processor-readable storage medium of claim 7, wherein training the at least one dense artificial neural network-based regressor model comprises training at least one dense artificial neural network-based regressor model using historical data pertaining to cloud resource provisioning and related order information.

9. The non-transitory processor-readable storage medium of claim 7, wherein the input layer comprises a number of neurons that matches a number of independent variables associated with the at least one neural network.

10. The non-transitory processor-readable storage medium of claim 7, wherein each neuron across the input layer, the one or more hidden layers, and the output layer connects with each other neuron, wherein each connection comprises a weight factor, and wherein each neuron comprises a bias factor.

11. The non-transitory processor-readable storage medium of claim 7, wherein training the at least one dense artificial neural network-based regressor model comprises training the at least one dense artificial neural network-based regressor model using historical data derived from one or more of at least one order management system, at least one supply chain-related system, at least one supplier and logistics system, at least one installation and deployment system, and at least one cloud provisioning system.

12. An apparatus comprising:

at least one processing device comprising a processor coupled to a memory;

the at least one processing device being configured:

to train at least one dense artificial neural network-based regressor model, comprising at least one input layer, one or more hidden layers, and at least one output layer, using historical data pertaining to cloud resource provisioning and related order information, wherein each of the one or more hidden layers comprises a number of neurons that is based at least in part on a number of neurons in the input layer, and wherein training the at least one dense artificial neural network-based regressor model comprises:

determining influence of one or more features in the
historical data on provisioning time of one or more
cloud resources by processing at least a portion of
the historical data using one or more univariate
analysis techniques and one or more bivariate
analysis techniques;

generating at least one training dataset by filtering at
least a portion the one or more features in the
historical data based at least in part on the deter-
mined influence of the one or more features; and training at least a portion of the at least one dense
artificial neural network-based regressor model
using the at least one generated training dataset;

to obtain data pertaining to at least one order related to
one or more hardware components, wherein the at
least one order comprises one or more cloud
resources;

to generate at least one temporal prediction for provi-
sioning the one or more cloud resources, in fulfill-
ment of the at least one order, by processing at least
a portion of the obtained data using the trained at
least one dense artificial neural network-based
regressor model; and to perform one or more automated actions based at least
in part on the at least one generated temporal pre-
diction, wherein performing the one or more auto-
mated actions comprises:

outputting the at least one temporal prediction to one
or more user devices associated with submitting
the at least one order and one or more external
systems associated with processing the at least one
order; and further training the at least one dense artificial neural
network-based regressor model based at least in
part on (i) actual provisioning time data associated
with fulfillment of the at least one order and (ii)
the at least one temporal prediction.

13. The apparatus of claim 12, wherein training the at
least one dense artificial neural network-based regressor
model comprises training at least one dense artificial neural
network-based regressor model using historical data pertain-
ing to cloud resource provisioning and related order infor-
mation.

14. The apparatus of claim 12, wherein the input layer
comprises a number of neurons that matches a number of
independent variables associated with the at least one neural
network.

15. The apparatus of claim 12, wherein each of the one or
more hidden layers comprises at least one rectified linear
unit activation function.

16. The apparatus of claim 12, wherein each neuron
across the input layer, the one or more hidden layers, and the
output layer connects with each other neuron, wherein each
connection comprises a weight factor, and wherein each
neuron comprises a bias factor.

17. The apparatus of claim 12, wherein training the at
least one dense artificial neural network-based regressor
model comprises training the at least one dense artificial
neural network-based regressor model using historical data
derived from one or more of at least one order management
system, at least one supply chain-related system, at least one
supplier and logistics system, at least one installation and
deployment system, and at least one cloud provisioning
system.

* * * * *